United States Patent
Niu et al.

(10) Patent No.: US 12,164,878 B2
(45) Date of Patent: Dec. 10, 2024

(54) SYSTEMS AND METHODS FOR CROSS-LINGUAL TRANSFER IN NATURAL LANGUAGE PROCESSING

(71) Applicant: Salesforce.com, Inc., San Francisco, CA (US)

(72) Inventors: Tong Niu, Sunnyvale, CA (US); Kazuma Hashimoto, Palo Alto, CA (US); Yingbo Zhou, Palo Alto, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 364 days.

(21) Appl. No.: 17/581,380

(22) Filed: Jan. 21, 2022

(65) Prior Publication Data

US 2023/0153542 A1    May 18, 2023

Related U.S. Application Data

(60) Provisional application No. 63/279,476, filed on Nov. 15, 2021.

(51) Int. Cl.
 *G06F 40/51* (2020.01)
(52) U.S. Cl.
 CPC .................... *G06F 40/51* (2020.01)
(58) Field of Classification Search
 CPC ......... G06F 40/51; G06F 40/284; G06F 40/45
 See application file for complete search history.

(56) References Cited

U.S. PATENT DOCUMENTS

| | | | |
|---|---|---|---|
| 2008/0015842 A1* | 1/2008 | Moore | G06F 40/45 704/4 |
| 2010/0057432 A1* | 3/2010 | Hua | G06F 40/45 704/2 |
| 2010/0070261 A1* | 3/2010 | Jin | G06F 40/51 704/2 |
| 2015/0169549 A1* | 6/2015 | Das | G06F 40/237 704/2 |
| 2017/0046333 A1* | 2/2017 | Mirkin | G06F 40/58 |
| 2020/0210758 A1* | 7/2020 | Upadhyay | G06F 40/295 |
| 2020/0285706 A1* | 9/2020 | Singh | G06N 3/08 |
| 2021/0065041 A1* | 3/2021 | Gopalan | G06F 16/353 |
| 2021/0192126 A1* | 6/2021 | Gehrmann | G06N 20/00 |
| 2021/0287273 A1* | 9/2021 | Janakiraman | G06Q 30/0623 |
| 2022/0188899 A1* | 6/2022 | Malhotra | G06N 3/042 |
| 2022/0253447 A1* | 8/2022 | Boytsov | G06N 3/08 |

(Continued)

OTHER PUBLICATIONS

Wu et al. Wu, S., & Dredze, M. (2020). Do explicit alignments robustly improve multilingual encoders?. arXiv preprint arXiv:2010.02537. (Year: 2020).*

(Continued)

*Primary Examiner* — Bhavesh M Mehta
*Assistant Examiner* — Philip H Lam
(74) *Attorney, Agent, or Firm* — Haynes and Boone, LLP

(57) ABSTRACT

Embodiments described herein provide a cross-lingual sentence alignment framework that is trained only on rich-resource language pairs. To obtain an accurate aligner, a pretrained multi-lingual language model is used, and a classifier is trained on parallel data from rich-resource language pairs. This trained classifier may then be used for cross-lingual transfer with low-resource languages.

19 Claims, 7 Drawing Sheets

(56) References Cited

U.S. PATENT DOCUMENTS

| | | | | |
|---|---|---|---|---|
| 2022/0414137 | A1* | 12/2022 | Sewak | G06F 16/313 |
| 2023/0004588 | A1* | 1/2023 | Jiao | G06N 3/045 |
| 2023/0122207 | A1* | 4/2023 | Segù | G06N 3/048 |
| | | | | 706/21 |
| 2024/0054767 | A1* | 2/2024 | Li | G06V 10/774 |

OTHER PUBLICATIONS

Farouk, M. (Dec. 2018). Sentence semantic similarity based on word embedding and WordNet. In 2018 13th International Conference on Computer Engineering and Systems (ICCES) (pp. 33-37). IEEE. (Year: 2018).*

Liu, Q., McCarthy, D., Vulić, I., & Korhonen, A. (2019). Investigating cross-lingual alignment methods for contextualized embeddings with token-level evaluation. (Year: 2019).*

Zhao, W., Eger, S., Bjerva, J., & Augenstein, I. (2020). Inducing language-agnostic multilingual representations. arXiv preprint arXiv:2008.09112. (Year: 2020).*

Ioffe, S., & Szegedy, C. (Jun. 2015). Batch normalization: Accelerating deep network training by reducing internal covariate shift. In International conference on machine learning (pp. 448-456). pmlr. (Year: 2015).*

Artetxe, M., & Schwenk, H. (2018). Margin-based parallel corpus mining with multilingual sentence embeddings. arXiv preprint arXiv:1811.01136. (Year: 2018).*

Korhonen, A., Traum, D., & Màrquez, L. (Jul. 2019). Proceedings of the 57th Annual Meeting of the Association for Computational Linguistics. In Proceedings of the 57th Annual Meeting of the Association for Computational Linguistics. (Year: 2019).*

International Search report and Written Opinion for PCT/US2022/079792, Dated Feb. 22, 2023, 13 pages.

Chi et al., "Improving Pretrained Cross-Lingual Language Models via Self-Labeled Word Alignment", Proceedings of the 59th Annual Meeting of the Association for Computational Linguistics and the 11th International Joint Conference on Natural Language Processing, Jun. 11, 2021, XP055847983, pp. 3418-3430.

Conneau et al., "XNLI: Evaluating Cross-lingual Sentence Representations", arxiv.org, Cornell University Library, 201 Olin Library Cornell University Ithaca, NY 14853, Sep. 13, 2018, XP081190976, 12 pages.

Doddapaneni et al.: "A Primer on Pretrained Multilingual Language Models", arxiv.org, Cornell University Library, 201, Olin Library Cornell University Ithaca, NY 14853, Jul. 1, 2021, XP091006504, 23 pages.

Libovický et al., "On the Language Neutrality of Pre-trained Multilingual Representations", arxiv.org, Cornell University Library, 201 Olin Library Cornell University Ithaca, NY 14853, Sep. 29, 2020, XP081774012, 12 pages.

Niu et al., "OneAligner: Zero-shot Cross-lingual Transfer with One Rich-Resource Language Pair for Low-Resource Sentence Retrieval", arxiv.org, Cornell University Library, 201 Olin Library Cornell University Ithaca, NY 14853, May 17, 2022, XP091227509, 14 pages.

Wu et al., "Do Explicit Alignments 1-20 Robustly Improve Multilingual Encoders?", arxiv.org, Cornell University ibrary, 201 Olin Library Cornell University Ithaca, NY 14853, 6 Oct. 6, 2020, XP081779383, 12 pages.

Zhang et al., "BERTScore: Evaluating Text Generation with Bert", arxiv.org, Cornell University Library, 201 Olin Library Cornell University Ithaca, NY 14853, Apr. 22, 2019, XP081605474, pp. 1-43.

* cited by examiner

FIG. 5

| Language | af | ar | bg | bn | de | el | es | et | eu | fa | fi | fr | he | hi | hu | id | it | ja | jv |
|---|---|---|---|---|---|---|---|---|---|---|---|---|---|---|---|---|---|---|---|
| VECO | 80.9 | 85.1 | 91.3 | 78.1 | 98.5 | 89.5 | 97.4 | 94.8 | 79.8 | 93.1 | 95.4 | 93.7 | 85.8 | 94.2 | 93.8 | 93.0 | 92.2 | 92.8 | 35.1 |
| ERNIE-M | 92.6 | 94.3 | 96.6 | 89.2 | 99.7 | 96.8 | 98.8 | 92.5 | 87.4 | 96.0 | 97.1 | 96.5 | 90.1 | 97.9 | 95.5 | 95.7 | 95.2 | 96.9 | 65.2 |
| OneAligner | 96.3 | 93.0 | 95.2 | 90.7 | 99.6 | 96.8 | 98.9 | 96.2 | 92.7 | 96.4 | 98.2 | 96.3 | 93.2 | 97.9 | 97.2 | 95.9 | 95.4 | 98.1 | 78.0 |
| OneAligner (All) | 97.4 | 94.7 | 95.3 | 92.2 | 99.6 | 97.3 | 99.0 | 98.6 | 95.7 | 96.9 | 98.2 | 96.5 | 94.1 | 98.3 | 98.1 | 96.7 | 96.6 | 98.5 | 78.5 |

| | ka | kk | ko | mr | ml | nl | pt | ru | sw | ta | te | th | tl | tr | ur | vi | zh | Average |
|---|---|---|---|---|---|---|---|---|---|---|---|---|---|---|---|---|---|---|
| VECO | 83.0 | 74.1 | 88.7 | 82.5 | 95.9 | 94.6 | 92.2 | 69.7 | 82.4 | 91.0 | 94.7 | 73.0 | 94.7 | 95.2 | 63.8 | 95.1 | 93.9 | 86.9 |
| ERNIE-M | 94.9 | 88.0 | 94.1 | 94.8 | 98.5 | 94.5 | 95.7 | 68.4 | 91.8 | 97.9 | 98.4 | 86.0 | 98.4 | 98.3 | 94.9 | 98.1 | 96.7 | 93.3 |
| OneAligner | 95.6 | 89.7 | 94.0 | 90.8 | 98.1 | 97.7 | 95.5 | 65.6 | 93.2 | 97.0 | 97.4 | 89.9 | 97.4 | 98.3 | 94.8 | 98.4 | 97.2 | 94.4 |
| OneAligner (All) | 95.6 | 91.3 | 95.3 | 92.7 | 98.3 | 98.4 | 95.8 | 63.6 | 93.2 | 96.6 | 97.8 | 88.3 | 97.8 | 98.9 | 95.6 | 98.5 | 97.3 | 94.9 |

FIG. 6

| Model | VECO | ERNIE-M | OneAligner TM Budget | OneAligner No Budget |
|---|---|---|---|---|
| # Parameters | 550M | 550M | 550M | 550M |
| # Languages | 50 | 96 | 100 | 100 |
| Mono. Data Size | 1.36TB | 1.56TB | 2.34TB | 2.34TB |
| Parallel Data Size | 1TB | 68.8GB | 145MB | 4.9GB |

| Language | af | am | ar | as | az | be | bg | bn | br | bs | ca | cs | cy | da | de | el | eo | es | et | eu | fa |
|---|---|---|---|---|---|---|---|---|---|---|---|---|---|---|---|---|---|---|---|---|---|
| Avg. Acc. | 92.2 | 90.9 | 92.9 | 90.8 | 92.3 | 89.8 | 92.6 | 92.7 | 91.3 | 91.1 | 92.0 | 92.0 | 91.4 | 92.0 | 92.5 | 92.8 | 91.7 | 92.4 | 92.1 | 92.6 | 92.5 |

| fi | fr | fy | ga | gd | gl | gu | ha | he | hi | hr | hu | hy | id | is | it | ja | ka | kk | km | kn |
|---|---|---|---|---|---|---|---|---|---|---|---|---|---|---|---|---|---|---|---|---|
| 92.3 | 92.7 | 88.2 | 91.5 | 53.2 | 92.1 | 90.0 | 90.9 | 92.7 | 90.6 | 92.3 | 90.9 | 92.4 | 92.5 | 91.8 | 92.3 | 92.6 | 90.0 | 90.5 | 91.2 | 55.4 |

| ko | ku | ky | li | lv | mg | mk | ml | mn | mr | ms | my | ne | nl | no | or | pa | pl | ps | pt |
|---|---|---|---|---|---|---|---|---|---|---|---|---|---|---|---|---|---|---|---|
| 92.4 | 90.6 | 26.0 | 91.9 | 92.3 | 92.3 | 92.6 | 90.4 | 92.7 | 20.6 | 85.0 | 91.1 | 92.4 | 91.9 | 26.2 | 90.1 | 91.9 | 85.8 | 92.3 | 92.2 |

| ro | si | sk | sl | sq | sr | sv | ta | te | th | tl | tr | ug | uk | ur | uz | vi | xh | yi | zh |
|---|---|---|---|---|---|---|---|---|---|---|---|---|---|---|---|---|---|---|---|
| 92.6 | 92.7 | 91.8 | 91.2 | 92.4 | 91.1 | 91.8 | 92.3 | 91.2 | 92.3 | 91.5 | 92.4 | 91.7 | 91.0 | 92.8 | 90.5 | 22.5 | 92.7 | | |

FIG. 7

| Language | fr-es | pt-es | de-fr | fr-pt | it-es | de-es | fr-nl | it-pt | de-cs | it-nl |
|---|---|---|---|---|---|---|---|---|---|---|
| Avg. Acc. | 92.0 | 91.5 | 92.2 | 92.0 | 92.0 | 92.1 | 92.0 | 92.1 | 92.2 | 92.1 |
| | ca-es | de-it | de-pt | de-nl | ni-es | pt-pt | fr-nl | nl-cs | | |
| | 90.9 | 92.3 | 92.3 | 92.2 | 92.6 | 92.3 | 92.3 | 92.0 | | |

FIG. 9

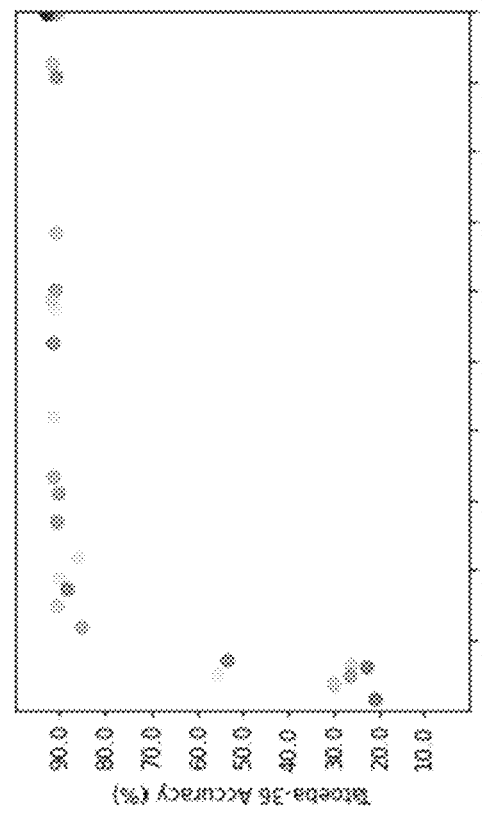

FIG. 8

| Model | Tatoeba-36 | New Tatoeba |  |
|---|---|---|---|
|  |  | Eng | ~Eng |
| Top1 (Eng) | 92.4 | 91.6 | 89.3 |
| Top1 (~Eng) | 92.0 | 91.5 | 89.2 |

FIG. 10

| Language | Top-1 | Top-2 | Top-4 | Top-8 | Top-16 | Top-32 | All |
|---|---|---|---|---|---|---|---|
| Avg. Acc. | 92.4 | 92.5 | 92.9 | 93.2 | 93.4 | 94.0 | 94.4 |

| Model | de | fr | ru | zh | Avg. |
|---|---|---|---|---|---|
| XLM-R-large | 67.5 | 66.5 | 73.5 | 56.7 | 66.1 |
| VECO | 93.0 | 88.7 | 89.9 | 85.7 | 89.3 |
| Top1 (Eng) | 91.7 | 90.0 | 89.5 | 90.9 | 90.5 |
| Top1 (~Eng) | 93.0 | 89.8 | 88.7 | 90.6 | 90.5 |

SYSTEMS AND METHODS FOR CROSS-LINGUAL TRANSFER IN NATURAL LANGUAGE PROCESSING

CROSS REFERENCE(S)

The present application is a nonprovisional of and claims priority under 35 U.S.C. 119 to U.S. provisional application No. 63/279,476, filed Nov. 15, 2021, which is hereby expressly incorporated by reference herein in its entirety.

TECHNICAL FIELD

The present disclosure relates generally to machine learning models and neural networks for natural language processing (NLP), and more specifically, to zero-shot cross-lingual transfer with one rich-resource language pair for low-resource sentence retrieval in NLP.

BACKGROUND

Cross-lingual sentence alignment refers to aligning an original sentence in a source language to a translated sentence in a target language. For example, due to different grammatical rules of the source language and the target languages, words in the original sentence may be aligned with words in the translated sentence may have different orders and thus words in different languages but having the same meanings are to be aligned. Cross-lingual sentence alignment may be used in various applications, including (1) mining parallel corpus for machine translation systems; (2) filtering existing parallel corpora to improve their quality; (3) estimating translation quality (Quality Estimation task) in two scenarios, e.g., one for evaluating already generated translations; or for deciding among potential candidates. To train cross-lingual sentence alignment models, training data in different language sources, however, can be extremely disparate. For example, there is often much richer training datasets in popular languages such as English, Spanish, French, and/or the like, but rather scare resources for less popular languages such as Mongolian, Malay, and/or the like.

BRIEF DESCRIPTION OF THE DRAWINGS

FIGS. 5-13 show various performance results of the aligner model described herein compared with baseline models in previous work, according to one or more embodiments described herein.

Figure 1:
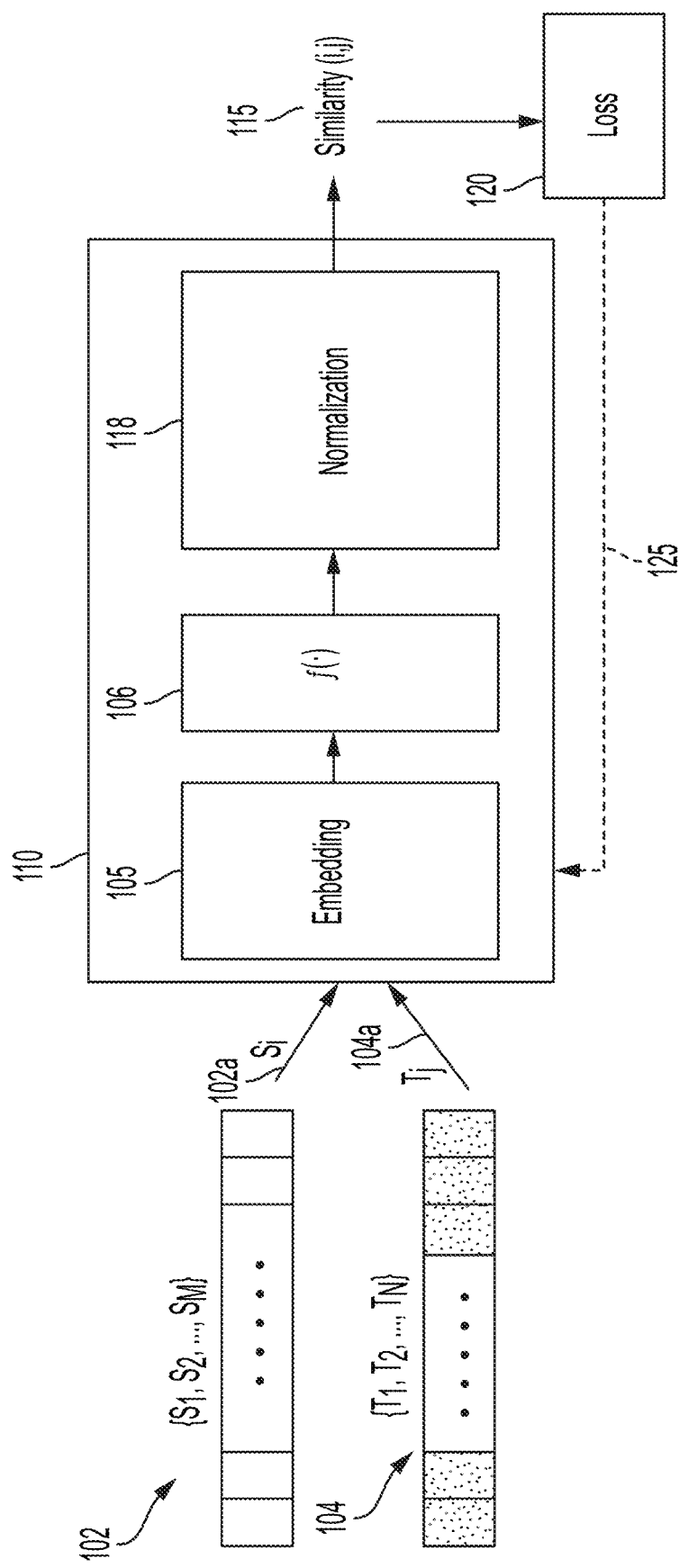
FIG. 1 is a simplified block diagram illustrating a training framework for the alignment model, according to one or more embodiments described herein.

In the figures and appendix, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "rich-source" or "low-resource" refers to size of available data. For example, when the parallel data size of language pairs crosses a certain threshold (e.g., 20K, 30K, etc.), such language pair is considered rich-sourced. Similarly, when the parallel data size of language pairs is lower than a certain threshold (e.g., 10K, 20K, etc.), such language pair is considered low-sourced.

Cross-lingual sentence alignment provides an important aspect in machine translation related tasks. Existing systems include two main streams of work, one completely unsupervised, the other supervised with data spanning across many language pairs. The unsupervised approach has the benefit of not collecting any parallel data, but can only achieve relatively low accuracies on benchmark datasets such as Tatoeba (Artetxe et al., Massively multilingual sentence embeddings for zero-shot cross-lingual transfer and beyond, Transactions of the Association for Computational Linguistics, 7:597-610, 2019), which evaluates on 36 language pairs including multiple low-resource ones. The supervised approach, on the other hand, assumes data access to a plethora of low-resource language pairs, which by definition is difficult to acquire and to ensure their quality. This all-or-nothing data choice between the unsupervised and supervised approaches leave a significant gap on whether zero-shot cross-lingual transfer works for such tasks. Therefore, it remains challenging to efficiently distribute the efforts for cross-lingual parallel data collection.

In view of the need to improve efficiency and accuracy of cross-lingual sentence alignment, embodiments described herein provide a cross-lingual sentence alignment framework that is trained only on extremely rich-resource language pairs (as long as one language pair works). To obtain an accurate aligner, a pretrained multi-lingual language model is used as a classifier to be trained on parallel data from rich-resource language pairs. This trained classifier may then be used for cross-lingual transfer with low-resource languages.

For example, the XLM-RoBERTa (XLM-R) network (described in Conneau et al., Unsupervised cross-lingual representation learning at scale, in Proceedings of the 58th Annual Meeting of the Association for Computational Linguistics, pages 8440-8451, Association for Computational Linguistics, 2020) may be adopted as the pre-trained multi-lingual language model for the alignment task. A supervised version of BERT-score may be computed as the semantic similarities between sentences and a normalization layer is built into the architecture of XLM-R to counteract the popular sentence effect, e.g., when some sentences in the source language tend to result in a high score with any sentence in the target language. In this way, when trained on any single rich-resource language pair, this model matches the performance of a model (e.g., within a 2.0 gap in accuracy) trained on all language pairs under the same data budget.

In one embodiment, to further close the narrow gap between using one language pair and all pairs for training while adhering to the rich-resource-only constraint, the number of language pairs are scaled up with the top-k rich-resource ones. This upgrade further improves the accuracy of the model, only 0.4 shy as compared to training on all language pairs under the same data budget.

In one embodiment, the model is trained with language pairs that are not centered around English, e.g., neither sentence in the language pair is in English. Without English as an anchor language, the training performance of the model is hardly impacted—the model will perform similarly as long as the amount of parallel data crosses a certain threshold.

FIG. 1 is a simplified block diagram illustrating a training framework for the alignment model, according to one or more embodiments described herein. FIG. 1 shows that a first batch of sentences 102, e.g., S={$S_1, S_2, \ldots, S_M$} in a source language, and a second batch of sentences 104, e.g., T={$T_1, T_2, \ldots, T_N$} in a target language, are input to an alignment model 110 for alignment.

Specifically, the alignment model 110 may determine whether each sentence in the batches 102 and 104 matches, e.g., whether $S_i$ 102a is aligned with $T_j$ 104a for all i=1, ..., M, and j=1, ..., N. The alignment model 110 may build on top of XLM-R, a Transformer-based model pre-trained on the monolingual CC-100 dataset covering 100 languages.

The alignment model 110 may include an embedding model 105, a BERT score computation module $f(\ )$ 106, and a normalization layer 118. Given two input sentences $S_i$ 102a and $T_j$ 104a, contextual embedding model 105 encodes the tokens in the source and target sentences into two vector representations, respectively. Specifically, the embedding model 105 may employ BERT (*Devlin et al.*, BERT: Pre-training of deep bidirectional transformers for language under-standing, in Proceedings of the 2019 Conference of the North American Chapter of the Association for Computational Linguistics: Human Language Technologies, Volume 1 (Long and Short Papers), pages 4171-4186, 2019) or ELMo (*Peters et al.*, Deep contextualized word representations, in proceedings of NAACL-HLT, 2018), which generates different vector representations for the same word in different sentences depending on the surrounding words, which form the context of the target word. For example, the embedding model 105 may adopt the BERT encoder which tokenizes the input text into a sequence of word pieces, where unknown words are split into several commonly observed sequences of characters. The representation for each word piece is computed with a Transformer encoder by repeatedly applying self-attention and nonlinear transformations in an alternating fashion.

Figure 2:
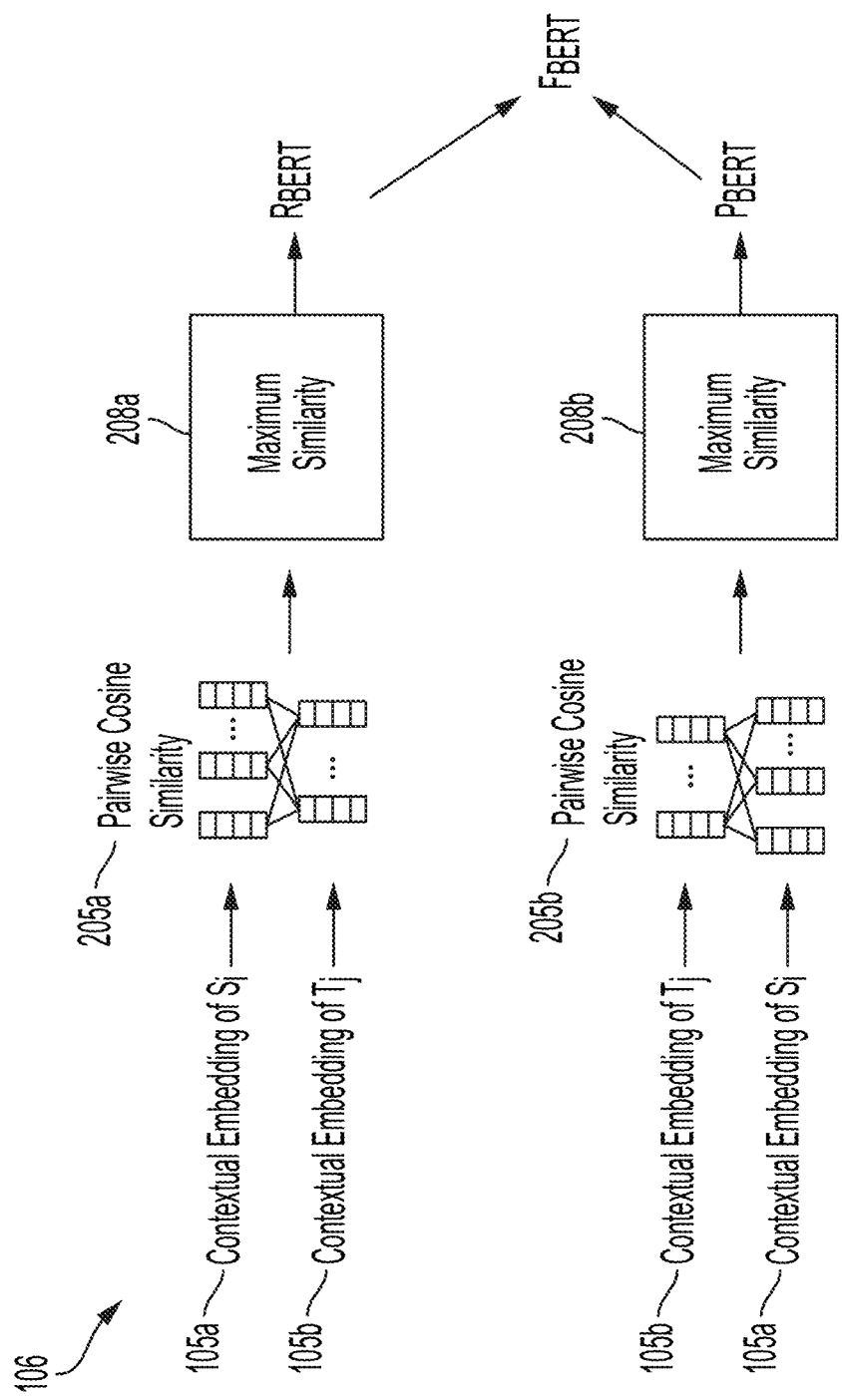
FIG. 2 is a simplified block diagram illustrating aspects of BERT score computation shown at module 106 in FIG. 1, according to one or more embodiments described herein.

The BERT score computation module 106 then computes a BERT score of the input sentences 102a and 104a using cosine similarity between the contextual embedding representations from the embedding model 105, optionally weighted with inverse sentence frequency scores, as further shown in FIG. 2.

FIG. 2 is a simplified block diagram illustrating aspects of BERT score computation shown at module 106 in FIG. 1, according to one or more embodiments described herein. For example, given the input sentence $S_i$ 102a, a sequence of vectors s=($s_1, s_2, \ldots, s_k$) denotes the contextual embeddings 105a of the input sentence $S_i$ 102a. Similarly, the sequence of vectors t=($t_1, t_2, \ldots, t_l$) denotes the contextual embeddings 105b of input sentence $T_j$ 102b.

First, a recall score is computed by matching each vector in the contextual embeddings s=($s_1, s_2, \ldots, s_k$) to match a vector in the contextual embeddings t=($t_1, t_2, \ldots, t_l$). Specifically, the pairwise cosine similarity 205a is computed between each vector in ($s_1, s_2, \ldots, s_k$) and a vector in the contextual embeddings ($t_1, t_2, \ldots, t_l$), and a maximum similarity 208a is taken, $$R_{BERT} = \frac{1}{|s|} \sum_{s_i \in s} \max_{t_j \in t} s_i^T t_j.$$

Similarly, a precision score is computed by matching each vector in the contextual embeddings t=($t_1, t_2, \ldots, t_l$) to match a vector in the contextual embeddings s=($s_1, s_2, \ldots, s_k$). Specifically, the pairwise cosine similarity 205b is computed between each vector in ($t_1, t_2, \ldots, t_l$) and a vector in the contextual embeddings ($s_1, s_2, \ldots, s_k$), and a maximum similarity 208b is taken, $$P_{BERT} = \frac{1}{|t|} \sum_{t_j \in t} \max_{s_i \in s} s_i^T t_j.$$

The BERT Score is then Computed as:

$$F_{BERT} = 2 \frac{P_{BERT} \cdot R_{BERT}}{P_{BERT} + R_{BERT}}.$$

Therefore, the BERT-score serves as a shallow cross-attention layer while being much faster than full cross-attention. The resulting model also remains agnostic to the order of the two sentences.

Referring back to FIG. 1, the computed BERT score of the input sentences 102a and 104a are fed to a normalization layer 118. In bitext alignment, it is often observed that some sentences in one language tend to have a high similarity score with any sentence in the other language. This phenomenon causes the ranking to be inaccurate. To offset this bias, a scaled average of similarity scores between each sentence in one language and all sentences in the other language is subtracted from the BERT score. In other words, a normalized similarity 115 between source sentence $S_i$ 102a and target sentence $T_j$ 104a is computed as:

$$\text{Similarity}(i, j) = f(S_i, T_j) - \alpha \left( \sum_{T_n \in T} f(S_i, T_n) + \sum_{S_m \in S} f(S_m, T_j) \right)$$

where $f(\ )$ stands for the function that computes semantic similarity. Note that this normalization step is built into the model architecture rather than serving only as a post hoc manipulation during inference. In practice, the number of sentences M and N could be quite large during inference, slowing down the normalization step, not to mention it is not guaranteed that the evaluation data is served in an offline fashion. Hence in-batch normalization is performed for each similarity score so that M and N only depend on the batch size during inference.

At inference stage, a decision may be made whether the two sentences $S_i$, $T_j$ are aligned, e.g., by a thresholding operation. For example, when the Similiary(i,j) is greater than a pre-defined threshold, the source sentence $S_i$ and the target sentence $T_j$ are considered to be a match.

During training, a challenging to train the aligner model 110 with only positive parallel data is that there are no carefully-designed negative examples. To address this challenge, a contrastive learning approach can be adopted and the aligner model 110 is trained on a classification task with in-batch negatives. For example, for the batch of sentences S={$S_1, S_2, \ldots, S_N$} in a source language, and a batch of sentences T={$T_1, T_2, \ldots, T_N$} in a target language, where $S_i$ is aligned with $T_i$ for each i, a pairwise semantic similarity between S and T is computed to obtain N similarities for the positive alignments, and $N^2$-N similarities for the negative ones (in total $N^2$ similarities computed). During training, these similarity scores are used as logits and pair each positive logit with all negative ones. These logits are then used to compute the contrastive loss 120, which is then used to update the aligner model 110 via backpropagation path 125.

Figure 3:
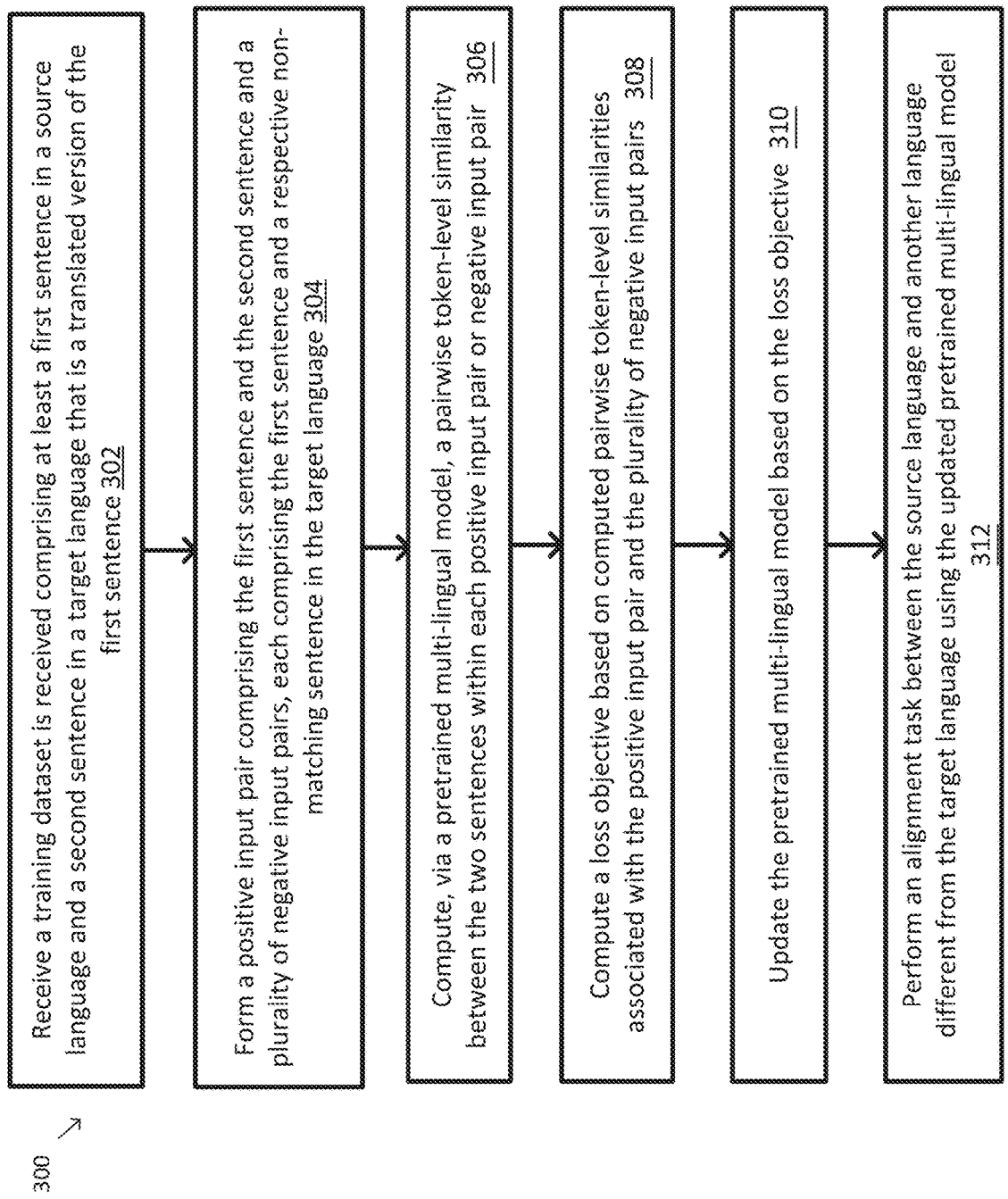
FIG. 3 is a simplified logic flow diagram illustrating a method of training an aligner model for cross-lingual sentence alignment, according to one embodiment described herein.

FIG. 3 is a simplified logic flow diagram illustrating a method of training an aligner model for cross-lingual sentence alignment, according to one embodiment described herein. One or more of the processes 302-312 of method 300 may be implemented, at least in part, in the form of executable code stored on non-transitory, tangible, machine-readable media that when run by one or more processors may cause the one or more processors to perform one or more of the processes 302-312. In some embodiments, method 300 may correspond to the method used by the module 430.

At step 302, a training dataset is received. The training dataset comprises at least a first sentence (e.g., sentence 102*a* in FIG. 1) in a source language and a second sentence (e.g., sentence 104*a* in FIG. 1) in a target language that is a translated version of the first sentence. For example, the source language and the target language belong to a group of rich-source languages, such as English-Spanish, English-French, etc.

In one embodiment, the training data set may be (1) an English-centered dataset such as OPUS-100; (2) a non-English-centered language dataset, e.g., the v2021-08-07 Tatoeba Challenge. OPUS-100 is English-centered, meaning that all training pairs include English on either the source or target side. The corpus covers 100 languages (including English). The languages for training are selected based on the volume of parallel data available in OPUS. The OPUS collection is comprised of multiple corpora, ranging from movie subtitles to GNOME documentation to the Bible. OPUS-100 contains approximately 55 M sentence pairs. For example, 99 language pairs are chosen for training the aligner model, 44 of which are chosen from 1M sentence pairs of training data, 73 chosen from at least 100 k, and 95 chosen from at least 10 k. Following OPUS-100's choice, the training data for each language pair in New-Tatoeba is capped at 1 M to make it easier to compare with OPUS-trained models.

At step 304, a positive input pair comprising the first sentence and the second sentence and a plurality of negative input pairs are formed. Each negative pair comprises the first sentence and a respective non-matching sentence in the target language. For example, for the batch of sentences $S=\{S_1, S_2, \ldots, S_N\}$ in a source language, and a batch of sentences $T=\{T_1, T_2, \ldots, T_N\}$ in a target language, where $S_i$ is aligned with $T_i$ for each i, a pairwise semantic similarity between S and T is computed to obtain N similarities for the positive alignments, and $N^2$-N similarities for the negative ones (in total $N^2$ similarities computed).

At step 306, a pretrained multi-lingual model may be used to compute a pairwise token-level similarity between the two sentences within each positive input pair or negative input pair. For example, the pairwise token-level similarity between two sentences may be computed as the BERT score described in relation to FIG. 2.

At step 308, a loss objective is computed based on computed pairwise token-level similarities associated with the positive input pair and the plurality of negative input pairs. For example, the similarity scores are used as logits and pair each positive logit with all negative ones. These logits are then used to compute a contrastive loss among the positive pairs and the negative pairs.

At step 310, the pretrained multi-lingual model is updated based on the loss objective.

At step 312, an alignment task may be performed between the source language and another language different from the target language using the updated pretrained multi-lingual model. For example, the pre-trained multi-lingual model that has been trained using rich language pairs (e.g., English-Spanish, English-French, etc.) only may then be used to align rare source language pairs (e.g., English-Mongolian, English-Malay, etc.). In some implementations, during inference stage, the aligner model (the pre-trained multi-lingual model that has been trained by method 300) can be used to align rare source language pairs without using English as an anchor language, e.g., neither language in the rare language pairs is English.

In one embodiment, the training method 300 for the aligner model may be executed on a single A100 graphics processing unit (GPU). For example, the training batch size is 64, and evaluation batch size is 256. These are the largest number of examples that can be fit in a batch with one GPU. Smaller training batch size may lead to lower performance and larger batch size can provide more in-batch negatives for each positive example.

Figure 4:
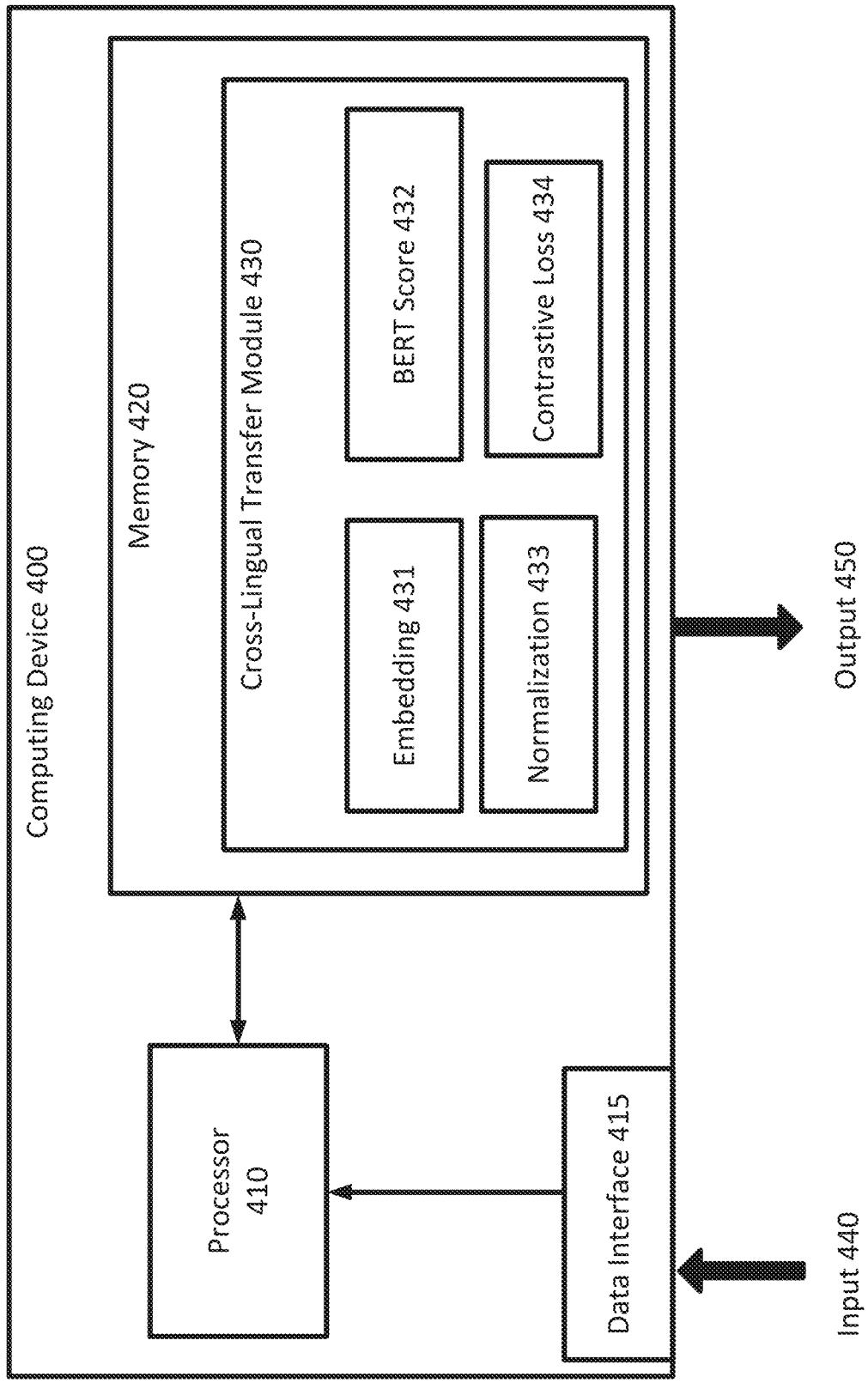
FIG. 4 is a simplified diagram of a computing device for implementing the cross-lingual sentence alignment, according to some embodiments.

FIG. 4 is a simplified diagram of a computing device for implementing the cross-lingual sentence alignment, according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for a paraphrase generation module 430 that may be used to implement and/or emulate the systems and models, and/or to implement any of the methods described further herein. In some examples, the cross-lingual transfer module 430, may receive an input 440, e.g., such as an input text in a source language and/or target language, via a data interface 415. The data interface 415 may be any of a user interface that receives an articulated audio input, or a communication interface that may receive or retrieve a previously stored training text from the database. The cross-lingual transfer module 430 may generate an output 450 such as an alignment with a sentence in the target language corresponding to the input 440.

In some embodiments, the cross-lingual transfer module 430 may implement the embedding module 431 (e.g., similar to 105 in FIG. 1), the BERT score module 432 (e.g., similar to 106 in FIG. 1), the normalization module 433 (e.g., similar to 118 in FIG. 1), and a contrastive loss module 434 (e.g., 120 in FIG. 1). In some examples, the cross-lingual transfer module 430 and the sub-modules 431-434 may be implemented using hardware, software, and/or a combination of hardware and software.

Some examples of computing devices, such as computing device 400 may include non-transitory, tangible, machine readable media that include executable code that when run by one or more processors (e.g., processor 410) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Example Performance

As described above, the aligner model may be trained by a training dataset of language pairs chosen from OPUS-100, and/or the v2021-08-07 Tatoeba Challenge. In one embodiment, for training purpose, all languages that are both in CC-100 and OPUS-100 are chosen without assuming a set of language pairs to be tested. Since OPUS-100 was sampled without Tatoeba and BUCC evaluation data in mind, any examples from OPUS where either the source or the target is in the test set may be removed.

FIGS. 5-13 show various performance results of the aligner model described herein compared with baseline models in previous work, according to one or more embodiments described herein.

In some embodiments, the aligner model may be tested via cross-lingual sentence retrieval tasks, which retrieve a matching sentence in the target language from a collection of sentences. Three evaluation datasets are used: the first one is the Tatoeba dataset from the XTREME benchmark (*Hu et al.*, Xtreme: A massively multilingual multi-task benchmark for evaluating cross-lingual generalization, in International Conference on Machine Learning, pages 4411-4421, 2020), which is referred to as Tatoeba-36 since it contains 36 language pairs; the second dataset is the v2021-08-07 Tatoeba Challenge,4 which is referred to as the New-Tatoeba. For evaluation purpose only language pairs that have more than or equal to 1K examples in the dev and test sets combined are kept. Following Tatoeba-36, where most language pairs have 1K test examples, 1K samples are randomly sampled for each language pair in New Tatoeba. The resulting evaluation set contains 223 language pairs, including 49 pairs that are English-centered and 174 pairs that are not. The third dataset is BUCC 2018 (*Zweigenbaum et al.*, Overview of the third BUCC shared task: Spotting parallel sentences in comparable corpora, in Proceedings of 11th Workshop on Building and Using Comparable Corpora, pages 39-42, 2018). This is a cross-lingual bitext mining task. This task is included because the two Tatoeba datasets are both ranking tasks, while BUCC requires universal threshold because during web mining each sentence in the source language does not necessarily have a translation in the target language. Hence these datasets contain a lot of distraction sentences. The drawback of BUCC is that it only involves 4 language pairs, all of which are highly rich-resource. Therefore, BUCC only serves as a sanity check for the aligner model.

Example baseline models for comparison with the aligner model include: VECO (*Luo et al.*, VECO: Variable and flexible cross-lingual pre-training for language understanding and generation, in Proceedings of the 59th Annual Meeting of the Association for Computational Linguistics and the 11th International Joint Conference on Natural Language Processing (Volume 1: Long Papers), pages 3980-3994, 2021) and ERNIE-M (*Ouyang et al.*, ERNIE-M: Enhanced multilingual representation by aligning cross-lingual semantics with monolingual corpora, in Proceedings of the 2021 Conference on Empirical Methods in Natural Language Processing, pages 27-38, 2021). Like the aligner model described herein (referred to as "OneAligner"), ERNIE-M is built on top of XLM-R. It is trained with monolingual and parallel corpora involving 96 languages. VECO shares the same model size as the aligner model and is trained with monolingual and parallel corpora involving 50 languages (possibly to avoid capacity dilution). The monolingual data is extracted from CC-100, while the bilingual data is collected from the OPUS website. There are 6.4 G parallel examples covering 879 language pairs. FIG. 6 shows the basic stats of each model.

The aligner model ("OneAligner") is trained on the entire OPUS-100 dataset, either with or without the 1 M budget. FIG. 5 shows that both models achieve state-of-the-art results on the Tatoeba-36 dataset. FIGS. 5 and 6 also show that the aligner model is more data-efficient as compared to the other two models.

FIG. 7 shows Tatoeba-36 performance for models trained on the OPUS-100 dataset for each language pair in the intersection of OPUS-100 and CC-100 languages. The performance is quite consistent across language pairs, which translates to the suggestion that one can finetune OneAligner with almost any language pair at hand and arrive at a similarly performed model.

FIG. 8 presents a scatter plot of FIG. 7 against the data availability of each language pair. After reaching a certain data size threshold (somewhere between 10 k and 20 k), all language pairs perform similarly. This is partially expected because the aligner model design does not introduce any new parameters to XLM-R—obviating the need to train randomly initialized parameters.

Similar to FIG. 7, FIG. 9 shows the accuracies of the aligner model trained on each of the Top-16 rich-resource non-English-centered pairs from the New-Tatoeba dataset. The performance is again consistent across language pairs, indicating that the model can be trained on a non-English language pair and still obtain similar performance on an evaluation set centered around English.

FIG. 10 addresses the reverse question on whether a model trained on English-centered data perform just as well on non-English evaluation data. In FIG. 10, when comparing column-wise, OneAligner performs similarly regardless of whether it is trained on an English-centered language pair or whether there is an overlap between finetuning and evaluation languages. When comparing each model evaluated on either English-centered or non-English-centered language pairs, both models perform better on English-centered language pairs. This is because English dominates the training data during the pretraining of XLM-R.

For example, rather than dividing in a bipolar fashion between "English-centered" and "non-English-centered", the setting can be described with a spectrum and explore X-centered, where X could be any language. The accuracy for language X is defined as the average of accuracies of all language pairs that involve X.

Figures 11, 12, 13:
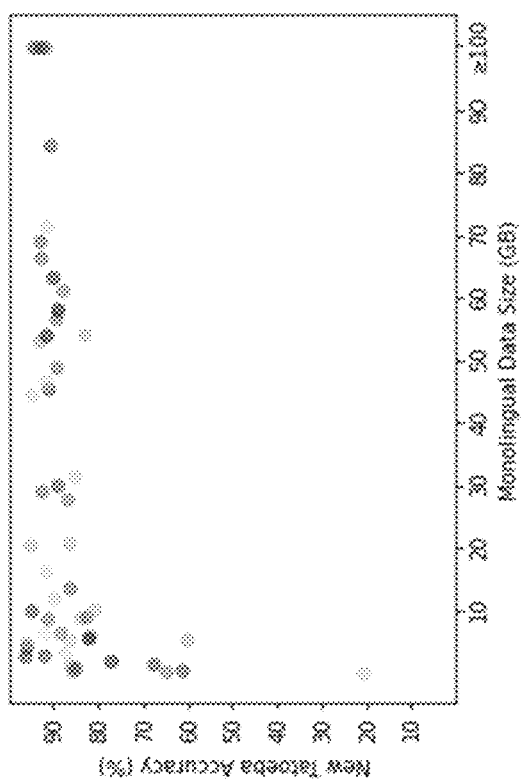

FIG. 11 shows the scatter plot of Top-1-Eng New-Tatoeba performance against monolingual data size for each language in the CC-100 dataset. Similar to FIG. 8, the New-Tatoeba performance is positively correlated with the monolingual data size up to a certain data threshold (somewhere be-low 10.0 GB).

The single-pair Tatoeba results are already satisfying. However, what if we aim for even better performance without violating the rich-resource-only assumption? We find that adding other rich-resource pairs can help. Unfortunately, OPUS-100 does not provide us with a ranking on which lan-guage pairs are the most rich-resource (recall that the size of each language pair is capped at 1 M in this dataset, and the original paper did not in-clude the data statistics before sampling), so we resort to the New-Tatoeba dataset and rank based on the availability of each English-centered pair.16

FIG. 12 shows performance of combined top-1 through top-32 rich-resource language pairs on the Tatoeba dataset. In FIG. 12, the performance monotonically increases as more language pairs are added, until an accuracy of 94.0 is reached-only 0.4 point off of the best performance that is achieved when training with all language pairs under the fixed 1 M budget. Note that the least rich-resource language UK in the top-32 list is still in the "highest"-resource range as defined in the Tateoba Challenge and contains around 34 M training examples, so the training is far from violating the rich-resource restrictions on the training data. Hence at least for the sentence retrieval task, the marginal cost of improving for that 0.4 point in accuracy does not seem to justify the effort of extensively collecting more low-resource parallel data with more language pairs.

FIG. 13 shows BUCC F1 scores of the two Top1 models as compared to previous work. Both models outperform VECO by 1.2 points. Recall that the English-centered Top1 model is trained with en-es. In other words, the model has not seen a single parallel example between en and each of the BUCC target languages {de, fr, ru, zh}, while VECO is trained extensively on each of the language pairs. This result is consistent with the observation that the aligner model is able to perform cross-lingual transfer with performance on par with in-language models irrespective of whether the finetuning language pair is English-centered.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of cross-lingual sentence alignment, the method comprising:
   receiving, via a communication interface, a training dataset comprising at least a first sentence in a source language and a second sentence in a target language that is a translated version of the first sentence;
   forming a positive input pair comprising the first sentence and the second sentence and a plurality of negative input pairs, each comprising the first sentence and a respective non-matching sentence in the target language;
   computing, via a pretrained multi-lingual model, a pairwise token-level similarity between two sentences within each positive input pair or negative input pair, wherein the pairwise token-level similarity between the two sentences is computed by:
   computing a similarity score between the two sentences based on cosine similarities between vector embeddings of the two sentences, and
   subtracting a scaled average of similarity scores between each sentence in the source language and all sentences of the target language in the training dataset and between each sentence in the target language and all sentences in the source language from the computed similarity score;
   computing a loss objective based on computed pairwise token-level similarities associated with the positive input pair and the plurality of negative input pairs;
   updating the pretrained multi-lingual model based on the loss objective; and
   performing an alignment task between the source language and another language different from the target language using the updated pretrained multi-lingual model.

2. The method of claim 1, wherein the vector embeddings of the two sentences are computed by:
generating, via a contextual embedding encoder, a first contextual embedding and a second contextual embedding of the two sentences within the respective positive input pair or negative input pair.

3. The method of claim 2, wherein the pairwise token-level similarity between the two sentences is computed by:
computing a first set of pairwise cosine similarities between all vectors in the first contextual embedding and a first vector in the second contextual embedding;
determining a first maximum similarity among the first set of pairwise cosine similarities; and
determining a first score based on the first maximum similarity.

4. The method of claim 3, further comprising:
computing a second set of pairwise cosine similarities between all vectors in the second contextual embedding and a second vector in the first contextual embedding;
determining a second maximum similarity among the second set of pairwise cosine similarities; and
determining a second score based on the second maximum similarity.

5. The method of claim 4, further comprising:
computing the similarity score based on the first score and the second score.

6. The method of claim 1, wherein the loss objective is computed as a contrastive loss using the computed pairwise token-level similarity for each positive input pair or negative input pair as output logit from the pretrained multi-lingual model.

7. The method of claim 1, wherein the source language and the target language belong to a group of rich-source languages.

8. The method of claim 1, wherein the another language is a rare-source language, and wherein the pre-trained multi-lingual model is not trained on any language sample of the rare-source language.

9. The method of claim 1, wherein neither the source language nor the target language is English.

10. A system of cross-lingual sentence alignment, the system comprising:
a communication interface receiving a training dataset comprising at least a first sentence in a source language and a second sentence in a target language that is a translated version of the first sentence;
a memory storing a pretrained multi-lingual model and a plurality of processor-executable instructions; and
a processor executing the plurality of processor-executable instructions to perform operations comprising:
forming a positive input pair comprising the first sentence and the second sentence and a plurality of negative input pairs, each comprising the first sentence and a respective non-matching sentence in the target language;
computing, via the pretrained multi-lingual model, a pairwise token-level similarity between two sentences within each positive input pair or negative input pair, wherein the pairwise token-level similarity between the two sentences is computed by:
computing a similarity score between the two sentences based on cosine similarities between vector embeddings of the two sentences, and
subtracting a scaled average of similarity scores between each sentence in the source language and all sentences of the target language in the training dataset and between each sentence in the target language and all sentences in the source language from the computed similarity score;
computing a loss objective based on computed pairwise token-level similarities associated with the positive input pair and the plurality of negative input pairs;
updating the pretrained multi-lingual model based on the loss objective; and
performing an alignment task between the source language and another language different from the target language using the updated pretrained multi-lingual model.

11. The system of claim 10, wherein the vector embeddings of the two sentences are computed by:
generating, via a contextual embedding encoder, a first contextual embedding and a second contextual embedding of the two sentences within the respective positive input pair or negative input pair.

12. The system of claim 11, wherein the pairwise token-level similarity between the two sentences is computed by:
computing a first set of pairwise cosine similarities between all vectors in the first contextual embedding and a first vector in the second contextual embedding;
determining a first maximum similarity among the first set of pairwise cosine similarities;
determining a first score based on the first maximum similarity;
computing a second set of pairwise cosine similarities between all vectors in the second contextual embedding and a second vector in the first contextual embedding;
determining a second maximum similarity among the second set of pairwise cosine similarities;
determining a second score based on the second maximum similarity; and
computing the similarity score based on the first score and the second score.

13. The system of claim 10, wherein the loss objective is computed as a contrastive loss using the computed pairwise token-level similarity for each positive input pair or negative input pair as output logit from the pretrained multi-lingual model.

14. The system of claim 10, wherein the source language and the target language belong to a group of rich-source languages.

15. The system of claim 1, wherein the another language is a rare-source language, and wherein the pre-trained multi-lingual model is not trained on any language sample of the rare-source language.

16. The system of claim 10, wherein neither the source language nor the target language is English.

17. A non-transitory processor-readable storage medium storing a plurality of processor-executable instructions for cross-lingual sentence alignment, the instructions being executed by a processor to perform operations comprising:
receiving, via a communication interface, a training dataset comprising at least a first sentence in a source language and a second sentence in a target language that is a translated version of the first sentence;
forming a positive input pair comprising the first sentence and the second sentence and a plurality of negative input pairs, each comprising the first sentence and a respective non-matching sentence in the target language;
computing, via a pretrained multi-lingual model, a pairwise token-level similarity between two sentences within each positive input pair or negative input pair, wherein the pairwise token-level similarity between the two sentences is computed by:

computing a similarity score between the two sentences based on cosine similarities between vector embeddings of the two sentences, and subtracting a scaled average of similarity scores between each sentence in the source language and all sentences of the target language in the training dataset and between each sentence in the target language and all sentences in the source language from the computed similarity score;

computing a loss objective based on computed pairwise token-level similarities associated with the positive input pair and the plurality of negative input pairs;

updating the pretrained multi-lingual model based on the loss objective; and performing an alignment task between the source language and another language different from the target language using the updated pretrained multi-lingual model.

18. The non-transitory processor-readable storage medium of claim 17, wherein the operations further comprise:

generating, via a contextual embedding encoder, a first contextual embedding and a second contextual embedding of the two sentences within the respective positive input pair or negative input pair;

computing a first set of pairwise cosine similarities between all vectors in the first contextual embedding and a first vector in the second contextual embedding;

determining a first maximum similarity among the first set of pairwise cosine similarities;

determining a first score based on the first maximum similarity;

computing a second set of pairwise cosine similarities between all vectors in the second contextual embedding and a second vector in the first contextual embedding;

determining a second maximum similarity among the second set of pairwise cosine similarities;

determining a second score based on the second maximum similarity; and computing the similarity score based on the first score and the second score.

19. The non-transitory processor-readable storage medium of claim 17, wherein the source language and the target language belong to a group of rich-source languages, wherein the another language is a rare-source language, and wherein the pre-trained multi-lingual model is not trained on any language sample of the rare-source language.

* * * * *